United States Patent
Obaidat et al.

(10) Patent No.: US 10,916,380 B1
(45) Date of Patent: Feb. 9, 2021

(54) QUANTUM DOT-SENSITIZED SOLAR CELL AND METHOD OF MAKING THE SAME

(71) Applicant: UNITED ARAB EMIRATES UNIVERSITY, Al Ain (AE)

(72) Inventors: Ihab M. Obaidat, Al Ain (AE); Hee-Je Kim, Busan (KR); Chandu V. V. Muralee Gopi, Busan (KR); Sambasivam Sangaraju, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 16/939,010

(22) Filed: Jul. 26, 2020

(51) Int. Cl.
*H01G 9/20* (2006.01)
*H01G 9/00* (2006.01)

(52) U.S. Cl.
CPC ......... *H01G 9/2022* (2013.01); *H01G 9/0029* (2013.01); *H01G 9/2004* (2013.01); *H01G 9/2031* (2013.01); *H01G 9/2054* (2013.01)

(58) Field of Classification Search
CPC .......................................... H01G 9/20–2095
See application file for complete search history.

(56) References Cited

FOREIGN PATENT DOCUMENTS

| CN | 102560674 A | * | 7/2012 |
|---|---|---|---|
| CN | 103117173 A | | 5/2013 |
| CN | 104548094 A | | 4/2015 |
| CN | 106128772 A | | 11/2016 |
| CN | 106803460 A | | 6/2017 |
| CN | 109437374 A | * | 3/2019 |
| CN | 109616328 A | | 4/2019 |
| KR | 20180130857 A | * | 12/2018 |

OTHER PUBLICATIONS

C. V. V. Muralee Gopi et al., "Nanostructured Ni-doped CuS thin film as an efficient counter electrode material for high-performance quantum dot-sensitized solar cells", Journal of Materials Science: Materials in Electronics 31, p. 975-982 [Published online Nov. 23, 2019] (Year: 2020).*
C.V.V. Gopi, et al., "Electronic Supporting Information: Highly efficient and stable quantum dot-sensitized solar cells based on Mn-doped CuS counter electrode" [retrieved from https://pubs.rsc.org/en/content/articlehtml/2015/ra/c4ra12968g on Sep. 1, 2020] (Year: 2015).*
C. V. V. Gopi, et al, "Highly efficient and stable quantum dot-sensitized solar cells based on a Mn-doped CuS counter electrode", RSC Advances 5, p. 2963-2967 (Year: 2015).*
J. Huo, et al., "Flower-like nickel cobalt sulfide microspheres modified with nickel sulfide as Pt-free counter electrode for dye-sensitized solar cells", Journal of Power Sources 304, p. 266-272 (Year: 2016).*

(Continued)

*Primary Examiner* — Eric R Smith
(74) *Attorney, Agent, or Firm* — Nath, Goldberg & Meyer; Richard C. Litman

(57) ABSTRACT

A quantum dot sensitized solar cell (QDSSC) includes a highly catalytic Ni-doped CuS thin film as a counter electrode (CE). The Ni-doped CuS CE can deliver outstanding electrocatalytic activity, conductivity, and low-charge transfer resistance at the CE/electrolyte interface. As a result, the QDSSC can achieve higher efficiency ($\eta$=4.36%) than a QDSSC with a bare CuS CE (3.24%).

3 Claims, 6 Drawing Sheets

(56) References Cited

OTHER PUBLICATIONS

M. P. A. Muthalif, C. D. Sunesh, and Y. Choe, "Improved photovoltaic performance of quantum dot-sensitized solar cells based on highly electrocatalytic Ca-doped CuS counter electrodes", Journal of Photochemistry and Photobiology A: Chemistry 358, p. 177-185 (Year: 2018).*

H-J. Kim et al., "Cost-effective and morphology controllable PVP based highly efficient CuS counter electrodes for high-efficiency quantum dot-sensitized solar cells", Dalton Transactions 44, p. 11340-11351 (Year: 2015).*

Machine translation of KR20180130857A (Year: 2018).*

Gopi et al., "Highly effective nickel sulfide counter electrode catalyst prepared by optimal hydrothermal treatment for quantum dot-sensitized solar cells," Journal of Power Sources, vol. 275, Feb. 1, 2015, pp. 547-556.

Gopi et al., "Nanostructured Ni-doped CuS thin film as an efficient counter electrode material for high-performance quantum dot-sensitized solar cells," Journal of Materials Science: Materials in Electronics, 31: 975-982, Nov. 23, 2019.

\* cited by examiner

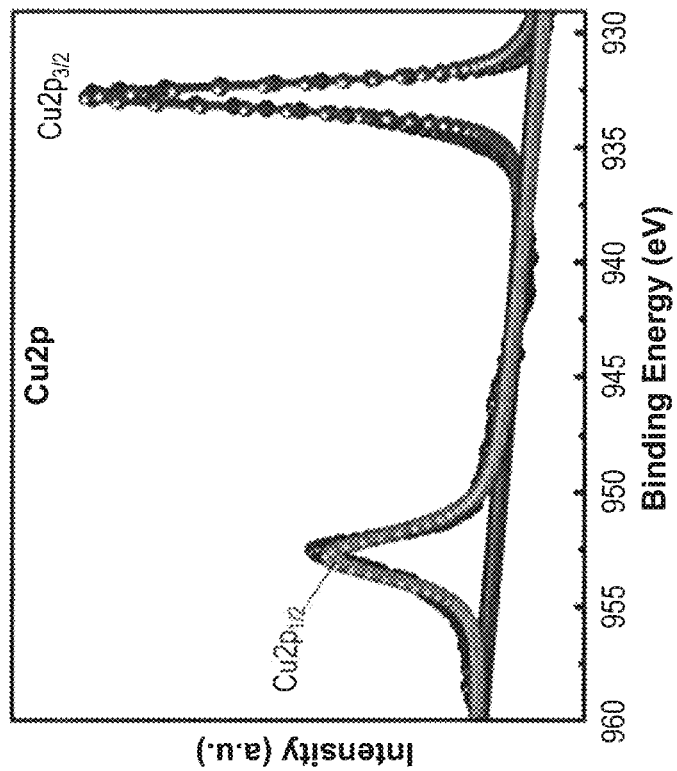
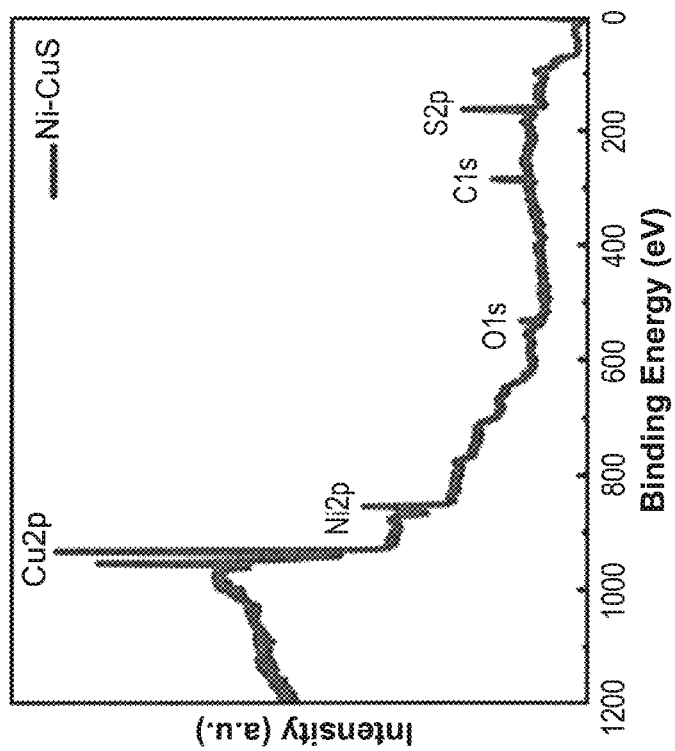
FIG. 2B
FIG. 2A

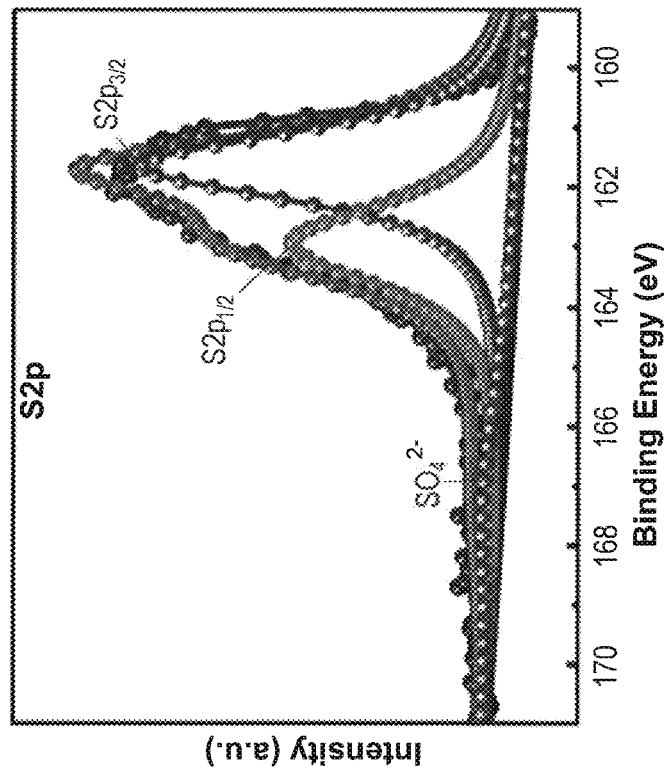
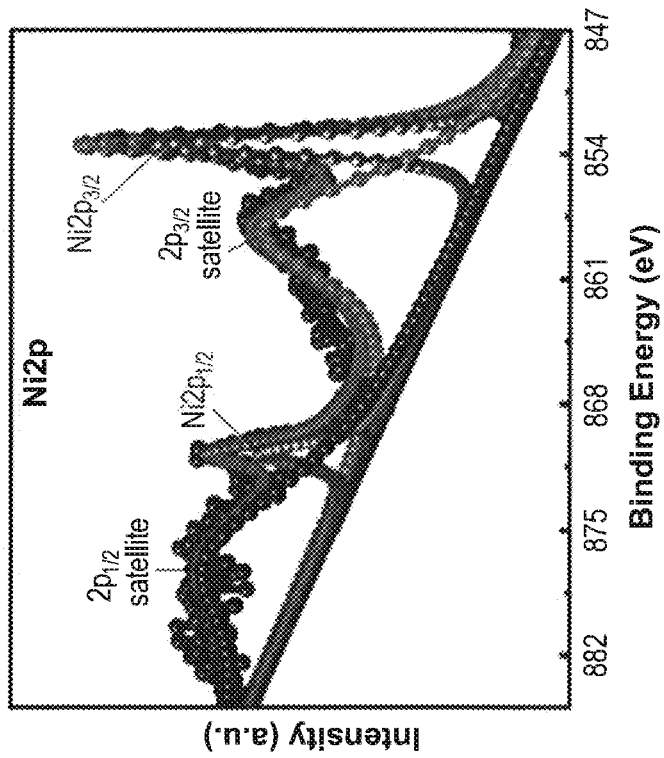
FIG. 2D
FIG. 2C

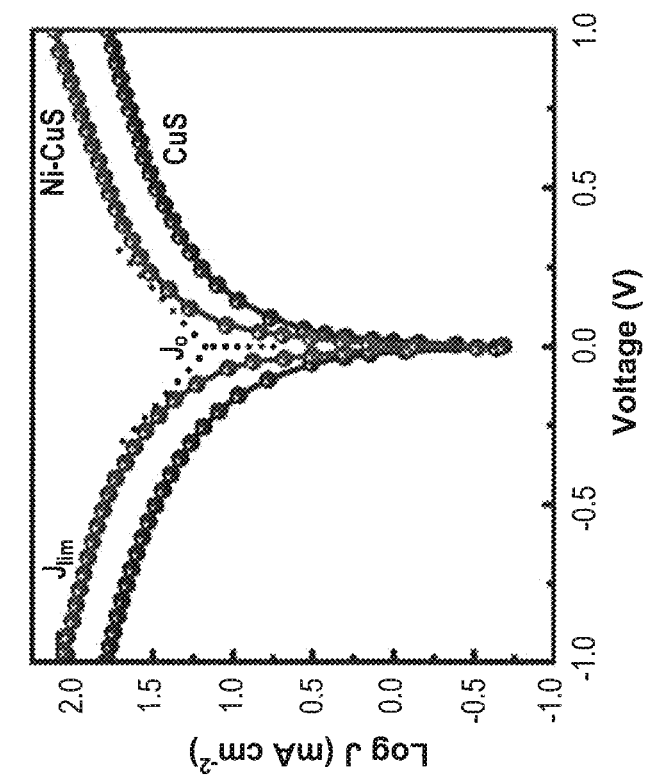
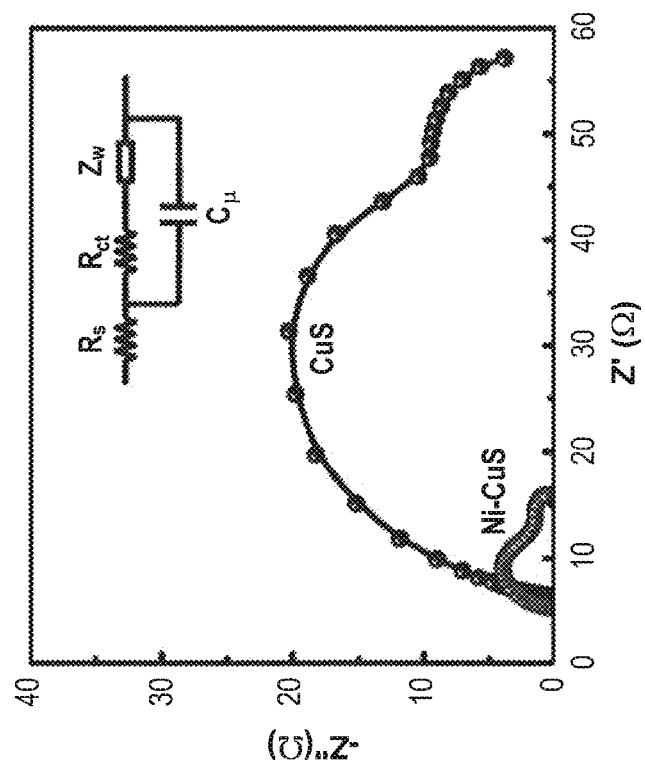
FIG. 4A
FIG. 4B

QUANTUM DOT-SENSITIZED SOLAR CELL AND METHOD OF MAKING THE SAME

BACKGROUND

1. Field

The disclosure of the present patent application relates to solar cells, and particularly to a quantum dot-sensitized solar cell having a Ni-doped CuS thin film counter electrode.

2. Description of the Related Art

With the increasing problems of energy demands, global warming and emission of greenhouse gases, the design and development of renewable energy sources have been getting more attention. Solar energy, in particular, is an appealing alternative for tackling many of the environmental challenges faced today. As one of the third generation solar cells, quantum dot-sensitized solar cells (QDSSCs) are considered to be one of the most promising third generation solar cells because they are cost-effective and can be easily prepared. In addition, quantum dot (QD) materials have outstanding properties, such as tunable band gap, high absorption coefficient and multiple exciton generation. Similar in structure to the structure of dye-sensitized solar cells (DSSCs), QDSSCs mainly include a quantum dot-sensitized photoanode, a liquid electrolyte containing redox couple (commonly, $S^{2-}/Sx^{2-}$) and counter electrodes (CEs). Even though, the QDs have outstanding properties, the efficiency of QDSSCs (~13%) is significantly lower than its theoretical efficiency and lower than that of the DSSCs.

In recent years, most of the studies have focused on enhancing the efficiency of QDSSCs by modifying and designing new QD sensitizers and suitable electrolytes. As one of the crucial components in the QDSSCs, the CE's function is to collect electrons from external circuits and catalyze the reduction of oxidized species in the electrolytes. Generally, platinum (Pt) is used as an efficient CE in DSSCs but is not suitable for optimizing the polysulfide redox couple for QDSSCs because of its poor electrocatalytic activity and chemisorption of electrolyte species on the surface of Pt. Hence, Pt-free CEs with excellent electrocatalytic activity, good conductivity and durability is desirable for the improvement of QDSSCs performance.

Recently, various metal sulfide CEs, such as NiS, CoS, CuxS, and PbS, have been widely examined for use in QDSSCs owing to their highly electrocatalytic activity and stable Pt-free CE materials. Among them, CuxS-based CEs deliver high electrocatalytic activity toward a polysulfide redox couple, which results in excellent photovoltaic performance. Generally, CuxS CEs are developed in situ on a brass sheet. However, this method suffers from continuous corrosion by the polysulfide redox couple, resulting in low chemical and mechanical stabilities.

Thus, a quantum dot sensitized solar cell solving the aforementioned problems is desired.

SUMMARY

A quantum dot sensitized solar cell (QDSSC) includes a highly catalytic Ni-doped CuS thin film as a counter electrode (CE). The Ni-doped CuS CE can deliver outstanding electrocatalytic activity, conductivity, and low-charge transfer resistance at the CE/electrolyte interface. As a result, the QDSSC can achieve higher efficiency ($\eta$=4.36%) than a QDSSC with a bare CuS CE (3.24%). These and other features of the present subject matter will become readily apparent upon further review of the following specification.

BRIEF DESCRIPTION OF THE DRAWINGS

FIGS. 2A-2D show XPS patterns of 2(A) survey spectrum and high-resolution spectra; (2B) Cu 2p; (2C) Ni 2p; and (2D) S 2p signals.

FIGS. 4A-4B show FIG. 4(A) EIS and 4(B) Tafel polarization plots of symmetrical cells based on CuS and Ni—CuS electrodes.

Similar reference characters denote corresponding features consistently throughout the attached drawings.

DETAILED DESCRIPTION OF THE PREFERRED EMBODIMENTS

Figure 1:
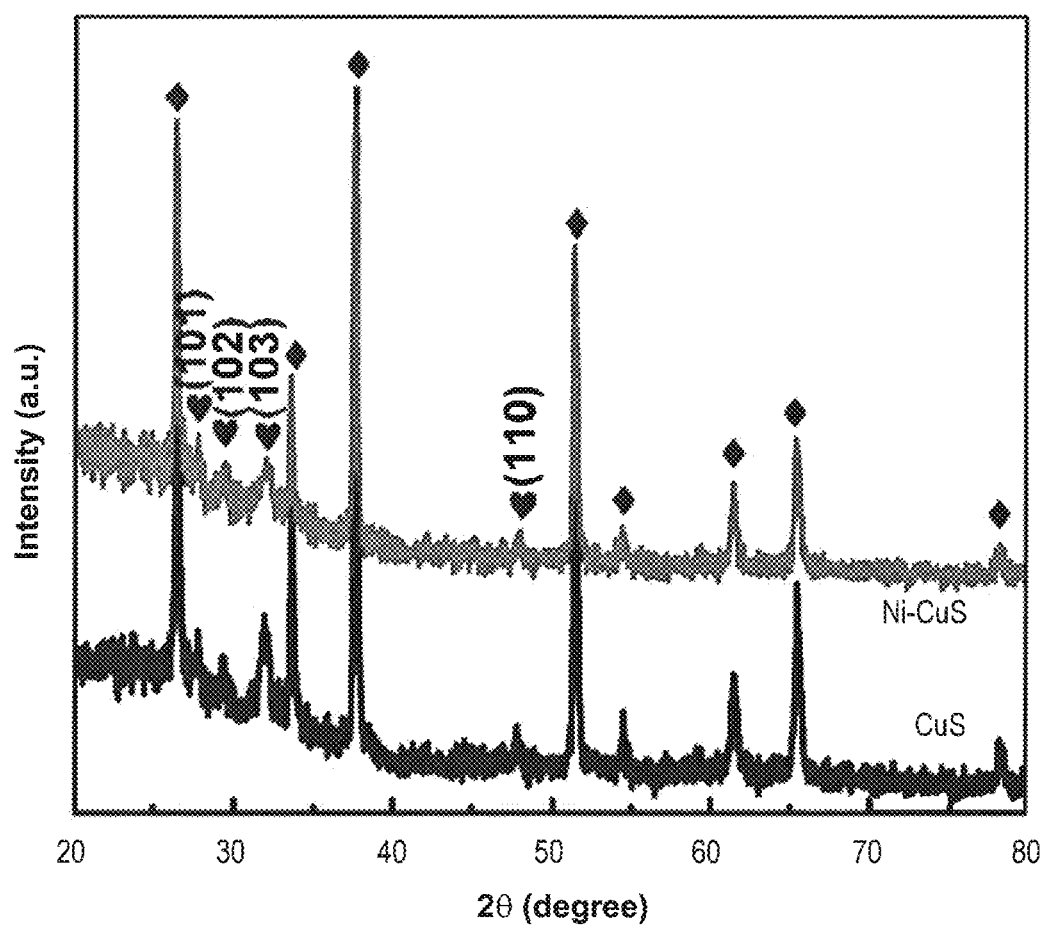
FIG. 1 is a graph showing the XRD pattern of CuS and Ni—CuS films on the FTO substrate.

A quantum dot-sensitized solar cell (QDSSC) includes a highly catalytic Ni-doped CuS thin film as a counter electrode (CE). The CE has high electrocatalytic activity and low charge transfer resistance. The Ni-doped CuS CE thin film can be fabricated on a fluorine-doped tin oxide (FTO) substrate via a facile chemical bath deposition method.

In an embodiment, the QDSSC, according to the present teachings includes a quantum dot-sensitized photoanode, a redox couple including a liquid electrolyte and a photocathode including the Ni-doped CuS counter electrode (Ni—CuS CE) thin film. In an embodiment, the photoanode includes $TiO_2$, CdS, and CdSe. In an embodiment, the redox couple includes a polysulfide electrolyte.

As described herein, the Ni—CuS counter electrode exhibits a higher electrocatalytic activity than bare CuS, i.e., without Ni doping. It was also found that doping in the CE material offers abundant active sites for the catalytic reactions and an enhanced pathway for fast electron transport, which results in a lower charge transfer resistance at the interface of CF/electrolyte. The Ni—CuS delivers a higher electrocatalytic activity than CuS for S'S redox couple. Further, the QDSSC with the Ni-doped CuS counter electrode provides a higher efficiency (4.36%) than the bare CuS (3.24%).

In an embodiment, a method of preparing a quantum dot-sensitized solar cell can include preparing a Ni-doped CuS solution; immersing a plurality of fluorine-doped tin oxide substrates vertically in the Ni-doped CuS solution; heating the substrates immersed in the Ni-doped CuS solution to provide a Ni-doped CuS thin film counterelectrode; providing a photoelectrode including $TiO_2$, CdS, and CdSe; assembling the counterelectrode and the photoelectrode together using a sealant; and filling a space between the photoelectrode and the counterelectrode with a polysulfide electrolyte. In an embodiment, substrates immersed in the Ni-doped CuS solution are heated in a hot air oven at about 60° C. for about 90 minutes.

The present teachings are illustrated by the following examples.

Example 1

Preparation of CuS and Ni-Doped CuS CEs on FTO Substrate

Prior to deposition, FTO substrates (Hartford Glass, 1.6× 1.3 cm$^2$) were thoroughly ultrasonically cleaned with acetone, ethanol and distilled (DI) water for 10 min each. The Ni-doped CuS and bare CuS counter electrodes were prepared on the FTO substrate through a facile chemical bath deposition (CBD) route. Briefly, a Ni-doped CuS solution was prepared by mixing 0.1 M of CuSO$_4$.5H$_2$O, 10 mM NiSO$_4$.6H$_2$O, 0.4 M of C$_2$H$_5$NS and 0.4 M of CH$_4$N$_2$O in 50 mL DI water to form a mixture. The mixture was stirred for 15 min to form a clear Ni-doped CuS solution. The cleaned FTO substrates were placed vertically in the Ni-doped CuS growth solution and kept in a hot air oven at 60° C. for 90 min. After deposition, Ni-doped CuS films (active area of ~0.7 cm$^2$) were taken from the solution and rinsed several times with DI water and ethanol. The as-prepared thin film was labelled "Ni—CuS." The bare CuS CE was also prepared without the addition of NiSO$_4$.6H$_2$O using a similar approach and labelled "CuS."

Example 2

Fabrication of QDSSCs and Symmetric Cells

TiO$_2$/CdS/CdSe photoelectrodes were fabricated using the procedure described in C. V. V. M. Gopi, S. S. Rao, S. K. Kim, D. Punnoose, H. J. Kim, "Highly effective nickel sulfide counter electrode catalyst prepared by optimal hydrothermal treatment for quantum dot-sensitized solar cells." *J. Power Sources* 275, 547-556 (2015). Based on this process, TiO$_2$ nanoparticles were first deposited on the FTO substrate using the doctor blade method (0.27 cm$^2$ active area). Then, TiO$_2$ films were in situ sensitized with CdS and CdSe using a facile SILAR method. Finally, the Ni—CuS CEs and TiO$_2$/CdS/CdSe photoelectrodes were assembled using a sealant (SX 1170-60, Solaronix) at 100° C. and the space between the electrodes was filled with a polysulfide electrolyte including 1 M Na$_2$S, 2 M S and 0.2 M KCl in methanol and water at a ratio of 7:3.

Two identical Ni—CuS and CuS electrodes were assembled using a sealant (SX 1170-60, Solaronix) at 100° C. to fabricate symmetrical cells and these cells were filled with the polysulfide redox couple.

Example 3

Characterization

The surface morphology, structure, crystal nature and chemical composition of Ni—CuS and CuS thin films were examined using a scanning electron microscope (SEM, S-2400, Hitachi), X-ray diffraction (XRD, D/Max-2400, Rigaku) and X-ray photon spectroscopy (XPS, VG Scientific ESCALAB 250). The photovoltaic current-voltage (J-V) characteristics were measured using an ABET Technologies (USA) solar simulator under one sun illumination (AM 1.5G, 100 mW cm$^{-2}$). The EIS (in the frequency range of 0.01 mHz to 500 kHz) and Tafel polarization (at a scan rate of 10 mV s$^{-1}$) measurement were conducted using a SP-150 BioLogic instrument for the symmetrical cells (Ni—CuS//Ni—CuS and CuS//CuS) in dark conditions.

The CuS and Ni—CuS CEs on FTO substrate were prepared using the facile CBD route described previously. Initially, the phase structure and composition of the CuS and Ni—CuS electrodes were examined by XRD characterization. FIG. 1 depicts the XRD pattern of the CuS and Ni—CuS thin films on the FTO substrate. Due to the background of the FTO substrate, the FTO peaks are obtained in the XRD pattern and are denoted with the diamond symbol. The diffraction peaks of CuS and Ni—CuS films at 2θ values of 27.7°, 29.4°, 32.0° and 47.9° are indexed to the (101), (102), (103) and (110) crystal planes of the hexagonal CuS phase (JCPDS no. 06-0464). The peak intensity changes observed in the XRD spectra suggest that the Ni dopant can introduce increased disorder into the CuS material structure and thereby improve the electrocatalytic reduction of polysulfide electrolytes in the QDSSC. These results confirm the successful deposition of CuS and Ni—CuS compounds on the FTO substrates.

Furthermore, the valence state of the elements in the Ni—CuS thin film was investigated using X-ray photoelectron spectroscopy (XPS). The survey spectra of Ni—CuS film and high-resolution spectrum of Cu 2p, Ni 2p and S 2p elements are shown in FIGS. 2A-2D. The survey spectra of Ni—CuS shows the existence of Cu, Ni, S, O, and C signals, where the O 1s signal is due to oxygen on the sample surface in air (FIG. 2A). As shown in FIG. 2B, the high-resolution Cu 2p spectrum shows the two peaks located at binding energy of 932.8 eV for Cu 2p$_{3/2}$ and 952.4 eV for Cu 2p$_{1/2}$, and there is no satellite peak in the Cu 2p spectrum, which reveals CuI+ state in the Ni—CuS film. As depicted in FIG. 2C, the Ni 2p spectra exhibits the peaks including Ni 2p$_{3/2}$ at 853.4 eV, Ni 2p$_{1/2}$ at 870.8 eV, and a satellite peak at 858.1 and 877.2 eV, which is consistent with the presence of Ni$^{2+}$ state in the Ni—CuS film. With respect to the S 2p spectrum in FIG. 2D, the two strong peaks observed at 161.6 and 162.9 eV were attributed to the binding energies of S 2p$_{3/2}$ and S 2p$_{1/2}$, which can be ascribed to the S2− signal. A weak satellite peak located at 168.0 eV can be attributed to the SO$_4^{2-}$ signal due to the sulfur oxidation, confirming the presence of surface oxidation. The XPS and XRD studies indicate that the Ni—CuS is successfully deposited on the surface of the FTO substrate.

The surface morphology of the CuS and Ni—CuS CEs were examined using SEM and the corresponding low and high-magnification SEM images. The CuS thin film on FTO substrate and the nanoflake structures were grown on the surface of the FTO substrate. When the Ni content was doped to the CuS, the surface became denser and the voids in between the nanoflakes were reduced with uniform deposition. An array of nanoparticles were grown on the nanoflake surface with the Ni doping of CuS. The nanoparticles of the Ni—CuS thin film offers abundant electroactive sites for the reaction of the polysulfide redox couple, supports the facial electron transfer and provides the enhanced electrocatalytic activity, which results in low charge transfer resistance at the CE/electrolyte interface.

Figure 3:
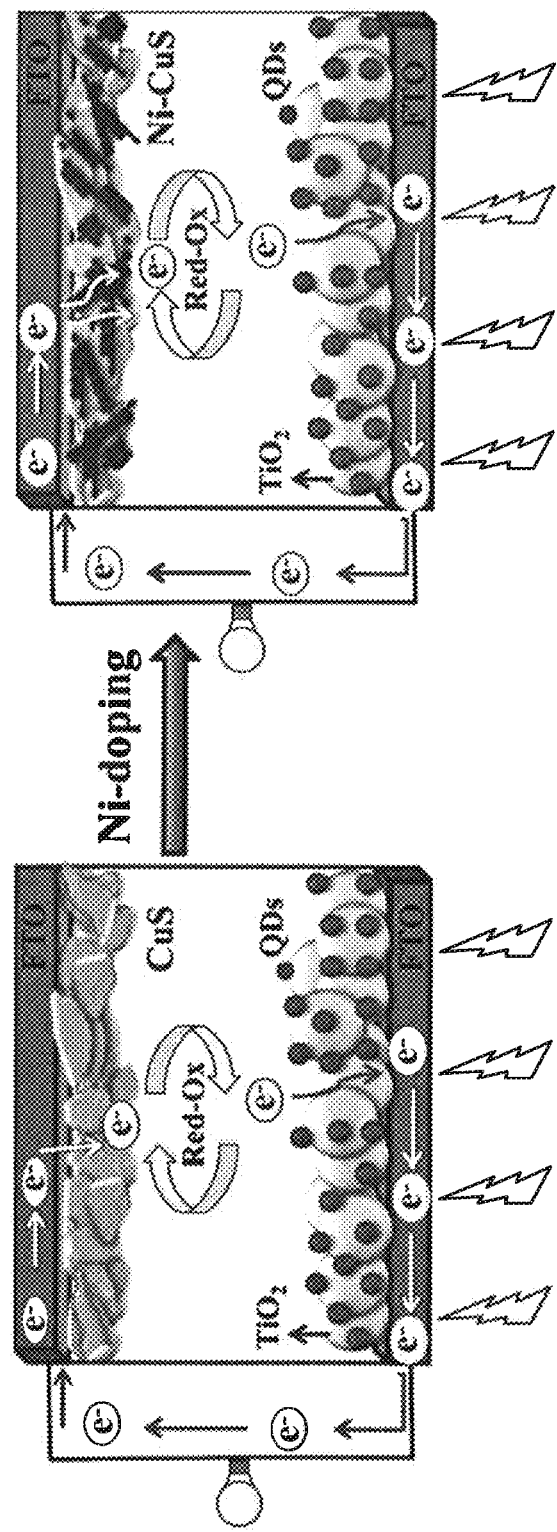
FIG. 3 is a schematic showing the QDSSCs based on CuS and Ni—CuS CEs and the electron charge transfer mechanisms at the interface of the CE/electrolyte.

FIG. 3 depicts the structure of the QDSSCs and the charge transfer process that occurred in the solar cells based on CuS and Ni—CuS CEs. Upon 1 sun illumination (AM 1.5G, 100 mW cm$^{-2}$), excitons were generated by the excited state of QDs and the electrons were driven toward the TiO$_2$ conduction band and finally transferred to the FTO substrate, while the hole transferred into the electrolyte and oxidized the polysulfide redox couple. The injected electrons flowed through the semiconductor network to the back contact, transferred to the nanoflake CuS CE, and then participated in the reduction reaction of Sx$^{2-}$ at the CuS CE/electrolyte interface. However, after doping with Ni in CuS CE (Ni—CuS), the favorable surface morphology of nanoparticles over nanoflake structures served as an excellent electrical tunnel for rapid electron transport from the external circuit, greatly enhanced the contact between Ni—CuS film and FTO, and also provided rich redox reactions, which resulted in high current density.

EIS and Tafel polarization measurements were conducted on symmetrical cells in dark conditions to investigate the charge transfer mechanism and electrocatalytic property of the CEs. EIS Nyquist plots of the CuS and Ni—CuS symmetrical cells are shown in FIG. 4A. The Nyquist plot shows the series resistance (RS) at the intercept of the X-axis in the high-frequency region. The semicircle in the middle frequency region corresponds to the charge transfer resistance (Rct) and chemical capacitance (Cμ) at the CE/electrolyte interface, while the low-frequency region represents the Warburg diffusion impedance (ZW) of the polysulfide electrolyte. The obtained Nyquist plots were analyzed using Z-software with the equivalent circuit model (inset of FIG. 4A). The corresponding Nyquist plots data are shown in Table 1. The Ni—CuS CE exhibits a lower RS (5.11Ω) than that of the bare CuS CE (6.43Ω). The higher series resistance is due to the network shape of Ni—CuS, resulting in a longer transport pathway for the electrons. More importantly, the Ni—CuS CE delivers the lowest $R_{ct}$ (7.82Ω) compared to bare CuS CE (41.07Ω), denoting that the Ni—CuS renders outstanding electrocatalytic activity. Further, Ni—CuS CE archives a higher Cμ value (681.27 μF) than the bare CuS CE (129.48 μF), representing that the Ni—CuS CE has larger active areas for the reduction of $S_x^{2-}$ to $S^{2-}$, consistent with the $R_{ct}$ trends of CuS<Ni-CuS. In addition, the Ni—CuS CE exhibited a smaller ZW of 2.99Ω than CuS CE (9.83Ω), revealing much more efficient diffusion of the polysulfide electrolyte at the CE/electrolyte interface.

Furthermore, a Tafel polarization study is a useful measurement to examine the electrocatalytic activity of CEs. The extrapolated intercept of the anodic and cathodic branches of the Tafel plot reveals an exchange current density ($J_O$) (FIG. 4B), which is directly related to the electrocatalytic activity of CE. Ni—CuS CE delivered a higher exchange current density ($J_O$) than that of bare CuS CE, revealing that a lower activation energy is needed by the reduction process of $S^{2-}/S_n^{2-}$ for Ni—CuS CE, which demonstrates the higher electrocatalytic activity of the Ni—CuS CE. In addition, the $J_O$ is directly related to the $R_{ct}$ using the following equation (1)]:

$$J_{\_O} = RT/(nFR_{\_ct}) \quad (1),$$

where R, n, T, and F have their usual meanings. $R_{ct}$ is the charge-transfer resistance obtained from the EIS study at the interface of CE/electrolyte. A higher $J_O$ for Ni—CuS CE contributes to lower $R_{ct}$ values in the EIS study.

In addition, Ni—CuS CE delivers a higher limiting current density ($J_{lim}$) than the bare CuS CE, indicating a higher diffusion velocity for the Ni—CuS CE in polysulfide redox couple. Based on equation (2), the $J_{lim}$ is directly related to the diffusion coefficient (D), which represents the diffusion behavior of the $S^{2-}/S_n^{2-}$ redox couple in the electrolyte.

$$D = J_{\_lim}/2nFC \quad (2),$$

where D, l, n, F and C have their usual meanings. Thus, the charge transfer property and electrocatalytic activity of Ni—CuS CE is much better than that of CuS CE. The Tafel polarization study is consistent with EIS results.

Figure 5B:
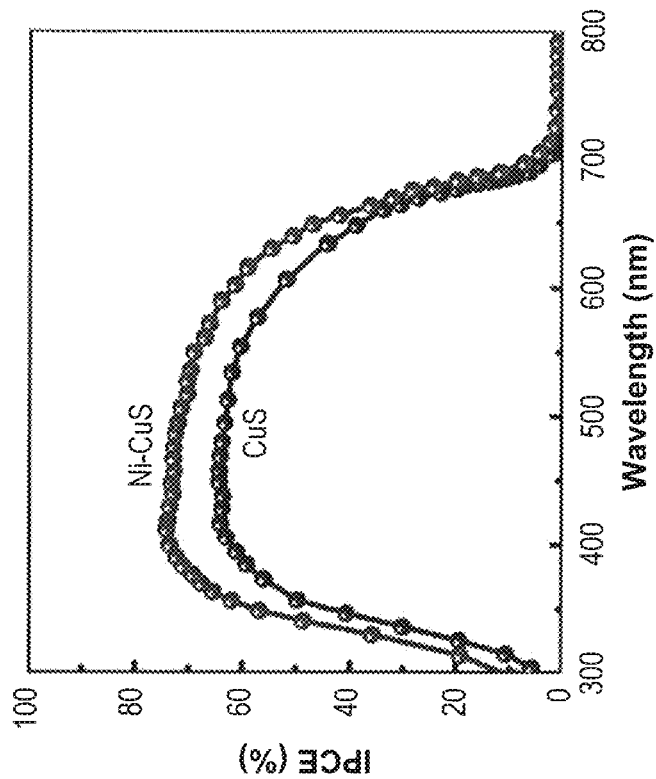
FIGS. 5A-5B show 5(A) J-V and 5(B) IPCE measurements of QDSSCs based on CuS and Ni—CuS counter electrodes.
Figure 5A:
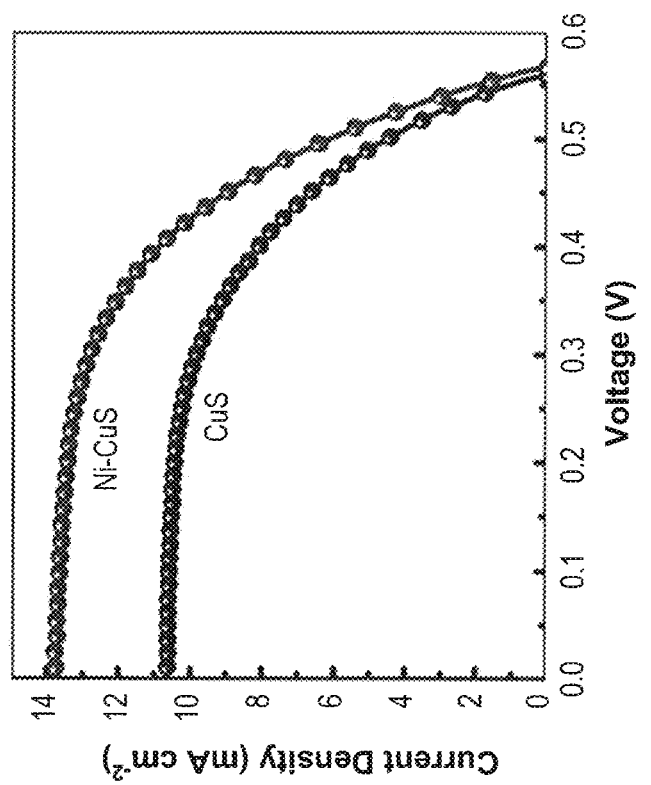

To investigate the performance of Ni—CuS as the CE of QDSSCs, TiO$_2$/CdS/CdSe was employed as the photoelectrode and $S^{2-}/S_x^{2-}$ as the electrolyte. FIGS. 5A-5B depict the J-V profiles of TiO$_2$/CdS/CdSe QDSSC based on Ni—CuS and bare CuS CEs, observed under the One Sun illumination (AM 1.5, 100 mW cm$^{-2}$). The corresponding photovoltaic parameters, such as photocurrent density ($J_{SC}$, mA cm$^{-2}$), open-circuit voltage ($V_{OC}$, V), fill factor (FF), and power conversion efficiency (η) are summarized in Table 1.

TABLE 1

Photovoltaic parameters of QDSSCs assembled with the TiO$_2$/CdS/CdSe/ZnS photoanode and the CuS and Ni—CuS CEs in the presence of the polysulfide electrolyte.

| Cell | $V_{OC}$ (V) | $J_{SC}$ (mA cm$^{-2}$) | FF | η % | $R_s$ (Ω) | $R_{ct}$ (Ω) | $C_μ$ (μF) | $Z_w$ (Ω) |
|---|---|---|---|---|---|---|---|---|
| CuS | 0.559 | 10.63 | 0.546 | 3.24 | 6.43 | 41.07 | 129.48 | 9.83 |
| Ni—CuS | 0.567 | 13.78 | 0.558 | 4.36 | 5.11 | 7.82 | 681.27 | 2.99 |

EIS and Tafel polarization measurements were conducted on symmetrical cells in dark conditions to investigate the charge transfer mechanism and electrocatalytic property of the CEs. Table 1 shows the EIS results of symmetrical cells fabricated with CuS and Ni—CuS CEs, and the cells filled with a polysulfide electrolyte. As depicted in Table 1, the QDSSC with Ni—CuS CE achieved excellent photovoltaic performance with an i of 4.36%, a $J_{SC}$ of 13.78 mA cm$^{-2}$, a $V_{OC}$ of 0.559 V, and a FF of 0.546, while the QDSSC with bare CuS CE had η of 3.24%. From the J-V results, the enhanced $J_{SC}$ and FF of the QDSSC with Ni—CuS can be attributed to the lower $R_{ct}$ as aforementioned in the EIS results and higher electrocatalytic activity of Ni—CuS. Hence, the J-V results demonstrate that Ni doping of CuS CE achieved good electrocatalytic activity for polysulfide redox couple and is very suitable to use as an effective CE for QDSSC. The IPCE measurement was also conducted to examine the outstanding performance of Ni—CuS as a CE. FIG. 5B depicts the IPCE spectra of the QDSSCs with CuS and Ni—CuS CEs as a function of wavelength. As shown in the figure, the QDSSC based on Ni—CuS CE exhibits a maximum IPCE value (74%) in the range of 350-700 nm compared with that of bare CuS CE (64%), which is consistent with the abovementioned J-V measurement, illustrating the outstanding performance of the Ni—CuS CE for the polysulfide electrolyte.

It is to be understood that the quantum dot-sensitized solar cell is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A quantum dot-sensitized solar cell, consisting of:
 a quantum dot-sensitized photoanode, the photoanode consisting of TiO$_2$, CdS, and CdSe;
 a redox couple including a liquid polysulfide electrolyte;
 a photo cathode including a Ni-doped CuS counter electrode, wherein the Ni-doped CuS is in the form of a plurality of nanoflake structures, each nanoflake structure comprising a nanoflake having an array of nanoparticles grown on a surface thereof, and a sealant.

2. The quantum dot-sensitized solar cell as recited in claim 1, wherein the counter electrode delivers a charge transfer resistance of 7.82Ω.

3. A method of preparing a quantum dot-sensitized solar cell, comprising:

preparing a Ni-doped CuS solution;

immersing a plurality of fluorine-doped tin oxide substrates vertically in the Ni-doped CuS solution, wherein the substrates immersed in the Ni-doped CuS solution are heated in a hot air oven at about 60° C. for about 90 minutes;

heating the substrates immersed in the Ni-doped CuS solution to provide a Ni-doped CuS counter electrode, wherein the Ni-doped CuS is in the form of a plurality of nanoflake structures, each nanoflake structure comprising a nanoflake having an array of nanoparticles grown on a surface thereof;

providing a photoelectrode consisting of $TiO_2$, CdS, and CdSe;

assembling the counter electrode and the photoelectrode together using a sealant; and filling a space between the photoelectrode and the counter electrode with a polysulfide electrolyte.

* * * * *